United States Patent
McWhorter et al.

(10) Patent No.: US 10,493,824 B2
(45) Date of Patent: Dec. 3, 2019

(54) CLAMP FOR VEHICLE ACCESSORY

(71) Applicant: Sportech, Inc., Elk River, MN (US)

(72) Inventors: Cory McWhorter, Big Lake, MN (US); Mario M Negri, Hopkins, MN (US)

(73) Assignee: Sportech, Inc., Elk River, MN (US)

( * ) Notice: Subject to any disclaimer, the term of this patent is extended or adjusted under 35 U.S.C. 154(b) by 0 days.

(21) Appl. No.: 15/699,956

(22) Filed: Sep. 8, 2017

(65) Prior Publication Data

US 2018/0111449 A1 Apr. 26, 2018

Related U.S. Application Data

(60) Provisional application No. 62/410,641, filed on Oct. 20, 2016.

(51) Int. Cl.
*B60J 1/00* (2006.01)
*F16M 13/02* (2006.01)

(52) U.S. Cl.
CPC ............ *B60J 1/006* (2013.01); *F16M 13/022* (2013.01); *B60J 1/00* (2013.01); *B60J 1/007* (2013.01)

(58) Field of Classification Search
CPC ..... B60J 1/00; B60J 1/006; B60J 1/007; B60J 1/008; B60J 10/72; B60J 1/18; F16M 13/02; F16M 13/022; F16M 2200/021; F16B 5/0685; F16B 2/22; B60K 1/00
USPC ... 248/231.81, 229.15, 229.25, 228.6, 230.6, 248/231.31, 231.71, 230.2, 228.2, 229.21, 248/229.11; 180/89.1
See application file for complete search history.

(56) References Cited

U.S. PATENT DOCUMENTS

| | | | | |
|---|---|---|---|---|
| 1,178,784 | A * | 4/1916 | Davis | B24B 41/06 24/486 |
| 4,477,865 | A * | 10/1984 | Tsuyama | B62J 6/00 248/230.7 |
| 4,947,777 | A * | 8/1990 | Yoder | A01K 91/08 114/221 R |
| 6,231,109 | B1 * | 5/2001 | Beaver | B60J 3/023 248/229.26 |
| 6,378,826 | B1 * | 4/2002 | Knaub | A63F 13/06 248/229.1 |
| 8,011,629 | B2 * | 9/2011 | Herskovic | A61G 7/0503 248/229.13 |
| 2015/0286115 | A1 * | 10/2015 | Koch | B62J 11/00 248/615 |
| 2017/0258659 | A1 * | 9/2017 | Katzenstein | A61G 13/101 |
| 2018/0038401 | A1 | 2/2018 | Cloutier | |

* cited by examiner

*Primary Examiner* — Nkeisha Smith
(74) *Attorney, Agent, or Firm* — Greenberg Traurig, LLP; Dipak J. Shah

(57) ABSTRACT

A clamp for removably coupling an accessory to a frame of a vehicle. The clamp includes a device portion configured for coupling with the accessory and a vehicle portion configured for coupling with both the device portion and the frame of the vehicle.

14 Claims, 5 Drawing Sheets

CLAMP FOR VEHICLE ACCESSORY

CROSS-REFERENCE TO RELATED APPLICATIONS

This application claims the benefit of U.S. Provisional Patent Application No. 62/410,641 filed Oct. 20, 2016, the entirety of which is hereby incorporated by reference.

STATEMENT REGARDING FEDERALLY SPONSORED RESEARCH OR DEVELOPMENT

Not applicable.

TECHNICAL FIELD

The present disclosure relates to devices for coupling an accessory to a vehicle. Particularly, the present disclosure relates to clamps for removably or fixedly coupling an accessory to a vehicle. More particularly, the present disclosure relates to clamps for removably or fixedly coupling an accessory to a vehicle without the use of tools.

BACKGROUND

Motorized vehicles, such as golf carts, all-terrain vehicles (ATVs), snowmobiles, motorcycles, utility vehicles (UTVs), fork lifts (material handling), agricultural equipment, and/or other motorized vehicles are commonly used for recreational and utility purposes. Some of these vehicles do not have windshields, rear wind deflectors, roofs, or other similar accessories. Without such accessories, wind and debris may blow in the face of the operator, causing reduced visibility and comfort. Other such vehicles may have windshields, wind deflectors, roofs, or other such accessories, which may be manufacturer-installed or after-market options. In either case, windshields may become damaged or worn during use or transportation, such as transportation in the bed of a truck or on a trailer. Once a windshield becomes damaged or worn, it may be desirable to remove the windshield for replacement or repair. Some windshields may be permanently attached and thus may not be difficult and/or expensive to remove. Other windshields may be more readily removable, but in many cases, removal may be difficult, requiring tools, such as specialty tools, and/or excessive time and/or money.

Thus, there is a need in the art for devices, systems, and methods allowing for readily installed and/or removable windshields for motorized vehicles, such as but not limited to, golf carts, ATVs, snowmobiles, and motorcycles. Particularly, there is a need in the art for a device for coupling a windshield to a motorized vehicle in a readily removable manner.

SUMMARY

A non-limiting exemplary embodiment of a clamp configured for removably coupling an accessory to a frame of a vehicle includes a device portion configured to be arranged on or through the accessory, and a vehicle portion configured for coupling with the device portion and the vehicle through an opening configured to receive an element of the frame of the vehicle. The vehicle portion is removable from the vehicle by prying the vehicle portion from the frame element.

A non-limiting exemplary embodiment of a system for removably coupling an accessory to a vehicle includes a plurality of clamps, wherein each clamp includes a device portion configured to be arranged on or through the accessory, and a vehicle portion configured for coupling with the device portion and the vehicle through an opening configured to receive an element of the frame of the vehicle. The vehicle portion is removable from the vehicle by prying the vehicle portion from the frame element.

DETAILED DESCRIPTION

One or more non-limiting embodiments are described herein with reference to the accompanying drawings, wherein like elements are designated by like numerals. It should be clearly understood that there is no intent, implied or otherwise, to limit the disclosure in any way, shape or form to the illustrated and described embodiments. While multiple exemplary embodiments are described, variations thereof will become apparent or obvious. Accordingly, any and all variants for providing functionalities similar to those of the described embodiments are considered as being within the metes and bounds of the instant disclosure.

The present disclosure relates to non-limiting exemplary embodiments of a device for coupling a windshield to a motorized vehicle, such as golf cart, all-terrain vehicle (ATV), snowmobile, motorcycle, and/or other motorized vehicle or non-motorized vehicle. In some embodiments, the device may be a clamp configured to removably or fixedly couple a windshield to a vehicle, such as to the frame of the vehicle. In some embodiments, the clamp may be operable without the use of tools or with limited tools. In some embodiments, the clamp may have a locking mechanism configured to lock the clamp into a desirable position with respect to the vehicle.

Figure 1:
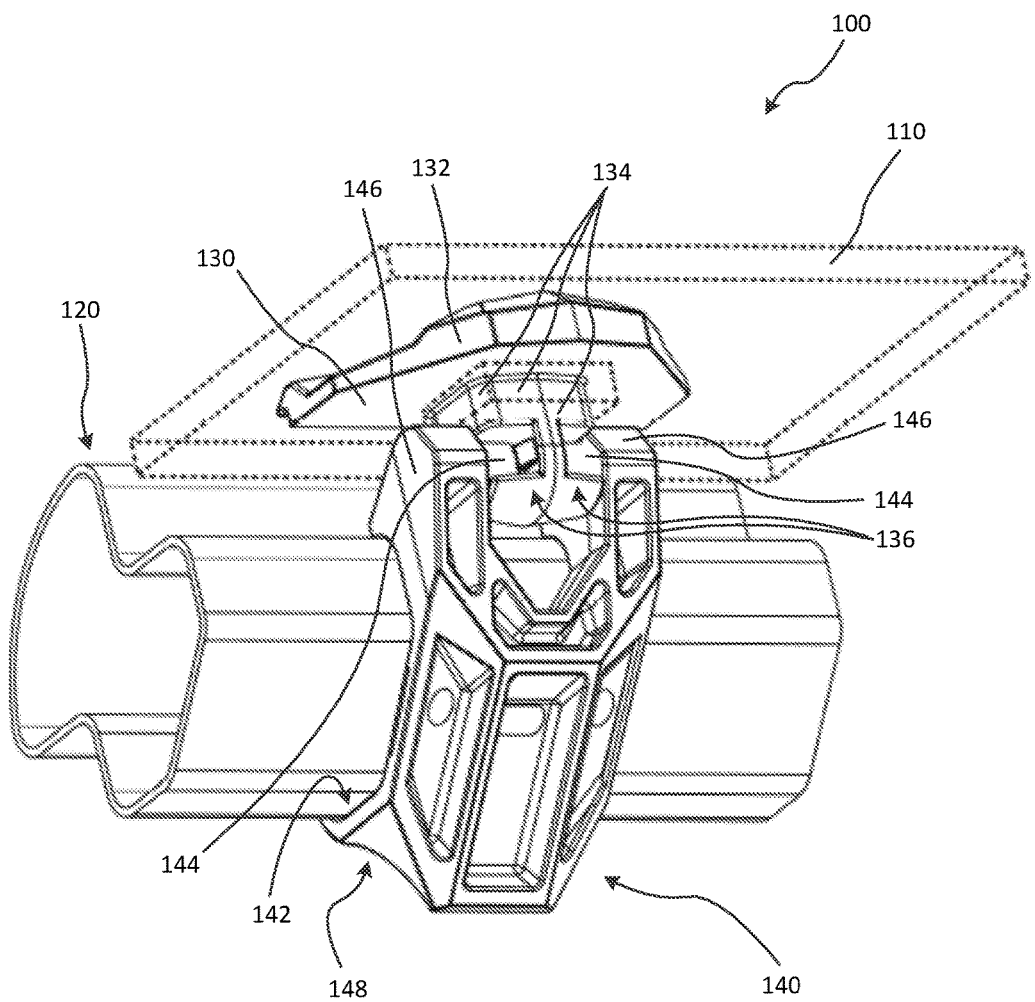
FIG. 1 is a perspective view of a non-limiting exemplary embodiment of a clamp.
Figure 2:
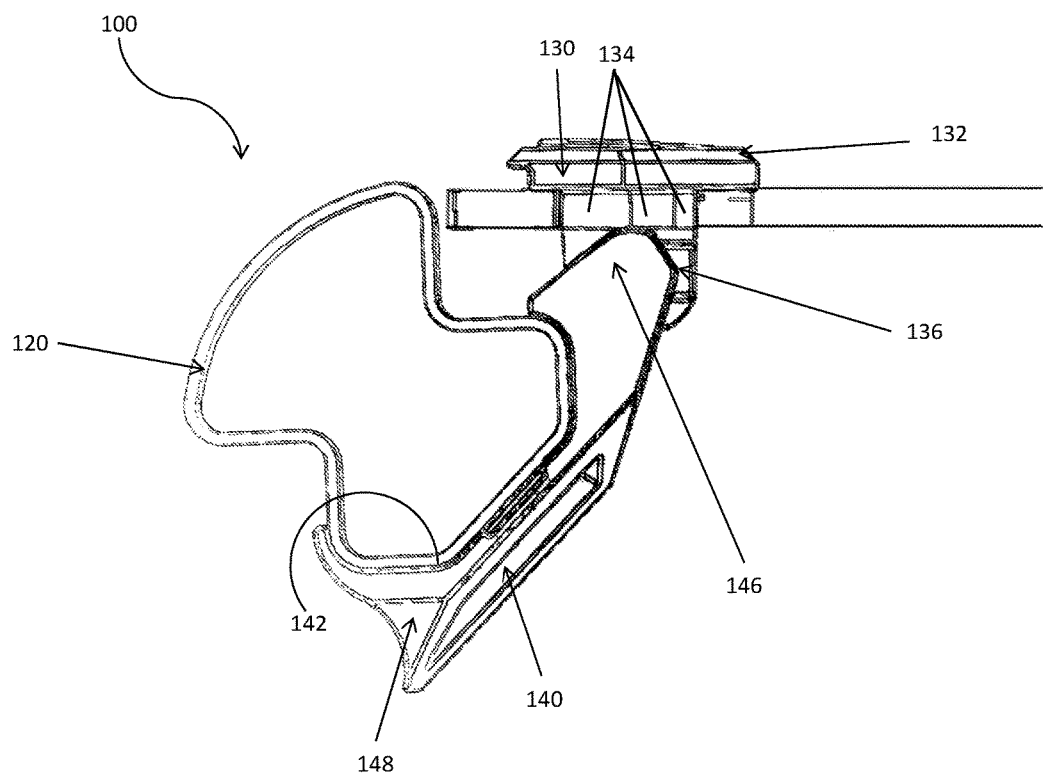
FIG. 2 is a side view of the clamp of FIG. 1.

FIGS. 1 and 2 illustrate a non-limiting exemplary embodiment of a clamp 100. As shown, the clamp 100 may be configured to couple an element or accessory, such as a windshield 110, to a vehicle body 120. The clamp 100 may generally have a device portion 130 configured to interact with the windshield 110 or other element or accessory, and a vehicle portion 140 configured to interact with the vehicle.

In a non-limiting exemplary embodiment, the device portion 130 of the clamp 100 may have an outer portion 132 and a pass through portion 134. The outer portion 132 may be configured to be arranged on an outer surface of the windshield 110 or other element or accessory, so as to grip or hold the windshield or other element or accessory. Where the element is a windshield 110 as shown in FIGS. 1 and 2, the outer portion 132 may be arranged on or against an external surface of the windshield. In some embodiments, the outer portion 132 may have a padded or rubber surface to more easily or effectively grip the windshield 110 surface without damaging the windshield. The pass through portion 134 may be configured to pass through the windshield 110 or other element or accessory. As shown in FIGS. 1 and 2, the pass through portion 134 may pass from an outer surface of the windshield 110, where the pass through portion couples to the outer portion 132, through an opening in the windshield, to an inner surface of the windshield, where the pass through portion may extend from the opening of the windshield and couple to the vehicle portion 140. As such, the windshield 110 or other element or accessory may have an opening configured to receive the pass through portion 134. In some embodiments, the pass through portion 134 may be configured to float within the windshield 110 so as to accommodate tolerance variations on the vehicle and the windshield. As such, the clamp 100 may be self-adjusting to accommodate tolerance variations. The pass through portion 134 may generally have a smaller width or diameter than the opening of the windshield 110 such that it may fit through the opening. The outer portion 132 may generally have a width or diameter larger than the opening of the windshield 110, such that it may grip or be arranged on a portion of the windshield surrounding the opening. The pass through portion 134 may have a slide or groove 136 configured to receive a component of the vehicle portion 140. The groove 136 may allow the vehicle portion 140 to be removably or fixedly coupled to the device portion 130.

In a non-limiting exemplary embodiment, the vehicle portion 140 of the clamp 100 may generally be configured to removably or fixedly couple to the device portion 130 so as to secure the windshield 110 or other element or accessory. In some embodiments, the vehicle portion 140 may be configured to couple to an element of the vehicle body 120, such as metal or plastic bar or other frame element. In some embodiments, the vehicle portion 140 may have an opening 142 configured to receive an element of the vehicle body 120 or a portion thereof. The opening 142 may have any suitable size and shape configured to receive a suitable element of the vehicle body 120, such as metal or plastic bar or tube or a portion thereof. In some embodiments, as shown in FIGS. 1 and 2, the opening 142 may be sized and shaped to receive a rollover protection structure (ROPS) bar or tube. In some embodiments, the opening 142 may generally have a semicircular or semi-oval shape. In some embodiments, the opening 142 may have one or more ridges or straight edges to accommodate a bar, tube, or other vehicle element. The bar, tube, or other vehicle element may be removably or fixedly arranged within the opening 142. The vehicle portion 140 and opening 142 may be configured such that the bar, tube, or other vehicle element may be pressed, slid, or snapped into the opening. In some embodiments, the vehicle portion 140 may flex slightly so as to accommodate receiving the bar, tube, or other vehicle element. In some embodiments, the vehicle portion 140 may couple to the vehicle body 120 via other means.

In some embodiments, the vehicle portion 140 may have one or more pins 144 configured to couple the vehicle portion to the device portion 130. The one or more pins 144 may be configured to slide into or otherwise be in communication with a slide or groove 136 of the device portion 130. In some embodiments, two opposing pins 144 may extend from the vehicle portion 140 and may be configured to slide within opposing grooves 136. In some embodiments, the vehicle portion 140 may have a cam portion 146. The cam portion 146 may be configured to press against the windshield 110 or other element or accessory. In some embodiments, the cam portion 146 may have an oval or other rounded and/or elongated shape. As the vehicle portion 140 and device portion 130 are coupled together, the cam portion 146 may act on the windshield 110 to push or pinch the windshield between the vehicle portion and the device portion. As shown in FIG. 1, in some embodiments, the vehicle portion 140 may have two cam portions 146, spaced on either of two sides of the vehicle portion and separated by the one or more pins 144 at which point the vehicle portion may couple to the device portion 130.

In some embodiments, the vehicle portion 140 may have a release handle 148. The release handle 148 may be configured to allow a user or operator to pry or pull the vehicle portion 140 off of a bar, tube, or other frame or vehicle element, so as to remove the windshield 110 from the vehicle. The release handle 148 may have any suitable size and shape. In some embodiments, the release handle 148 may be sized and shaped such that a user or operator may push the release handle with a thumb or finger.

In use, the clamp 100 may generally operate to removably or fixedly couple the windshield 110, or other element or accessory, to the vehicle body 120. In some embodiments, the vehicle portion 140 may be coupled to a bar, tube, or other frame or vehicle element. As described above, the device portion 130 may be arranged on or in communication with the windshield 110 or other element or accessory. In some embodiments, the pass through portion 134 may be positioned through an opening in the windshield 110 configured to receive the pass through portion, such that the outer portion 132 is arranged adjacent to or against an outer surface of the windshield and the pass through portion extends beyond an inner surface of the windshield. The device portion 130 and vehicle portion 140 may be coupled together in order to secure the windshield 110 between the two components. In some embodiments, the device portion 130 and vehicle portion 140 may couple together by sliding or otherwise arranging the one or more pins 144 of the vehicle portion into the groove 136 of the device portion 130. In some embodiments, the one or more pins 144 may snap into position in the groove 136 and may be held in place may a component such as a detent. As the vehicle portion 140 is slid into place within the groove 136 of the device portion 130, the cam portion 146 may operate to hold the windshield 110 against the outer portion 132 of the device portion. In some embodiments, the vehicle portion 140 may be configured to couple to a bar, post, or other element by snapping or pushing the bar or tube of the vehicle frame into the opening 142 of the vehicle portion 140. In this way, the windshield 110 may be removably or fixedly coupled to the vehicle. One or more clamps 100 may be used to securely hold the windshield 110 on the vehicle during operation of the vehicle, so as to protect the operator from wind and/or debris. In some embodiments, two or four clamps 100 may be used to hold a windshield 110 onto a vehicle. In other embodiments, any suitable number of clamps may be used.

In some embodiments, a user or operator may use the release handle 148 to pull or pry the vehicle portion 140 away from the bar, tube, or other vehicle element, so as to remove the windshield 110 from the vehicle. In this way, the windshield 110 may be removed for repair or replacement.

Figure 3:
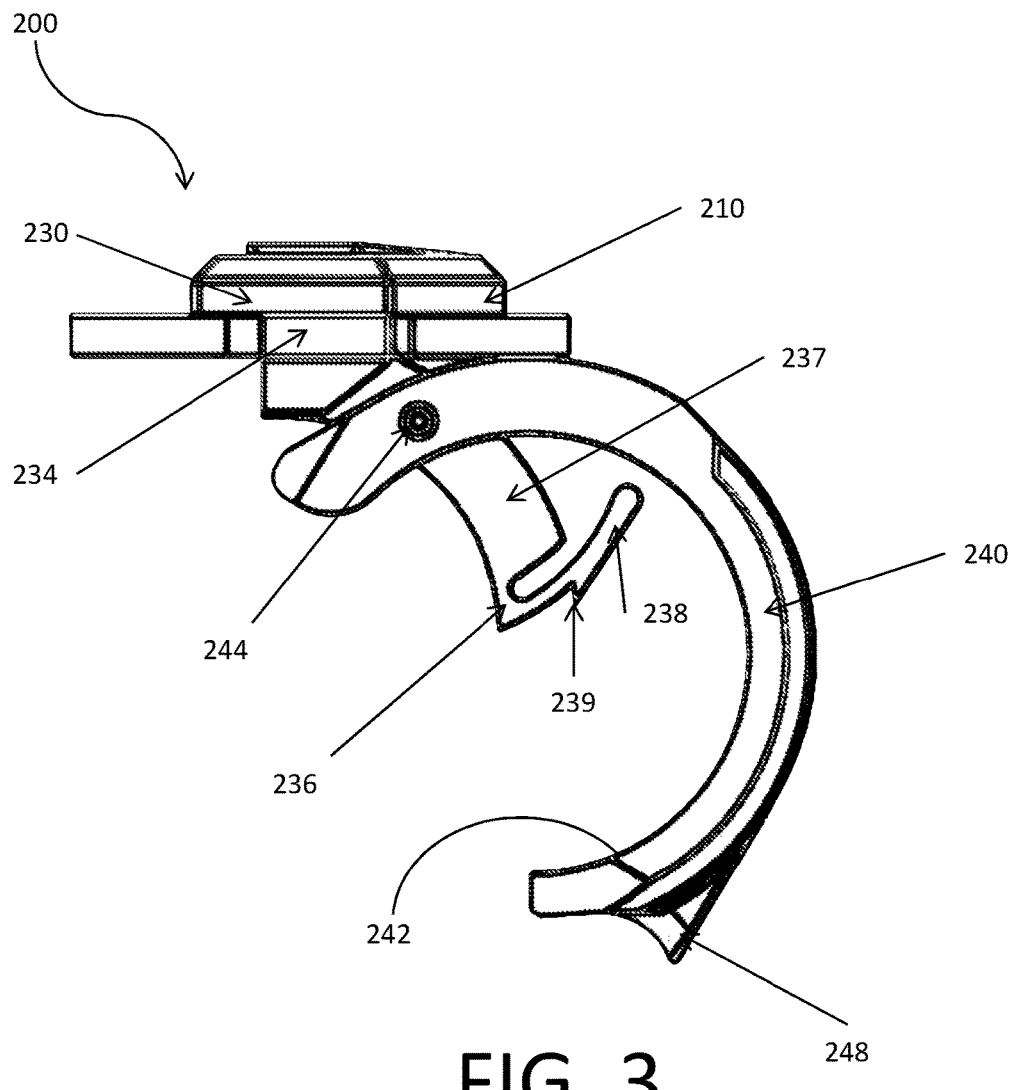
FIG. 3 is a side view of another non-limiting exemplary embodiment of a clamp in an open position.
Figure 4:
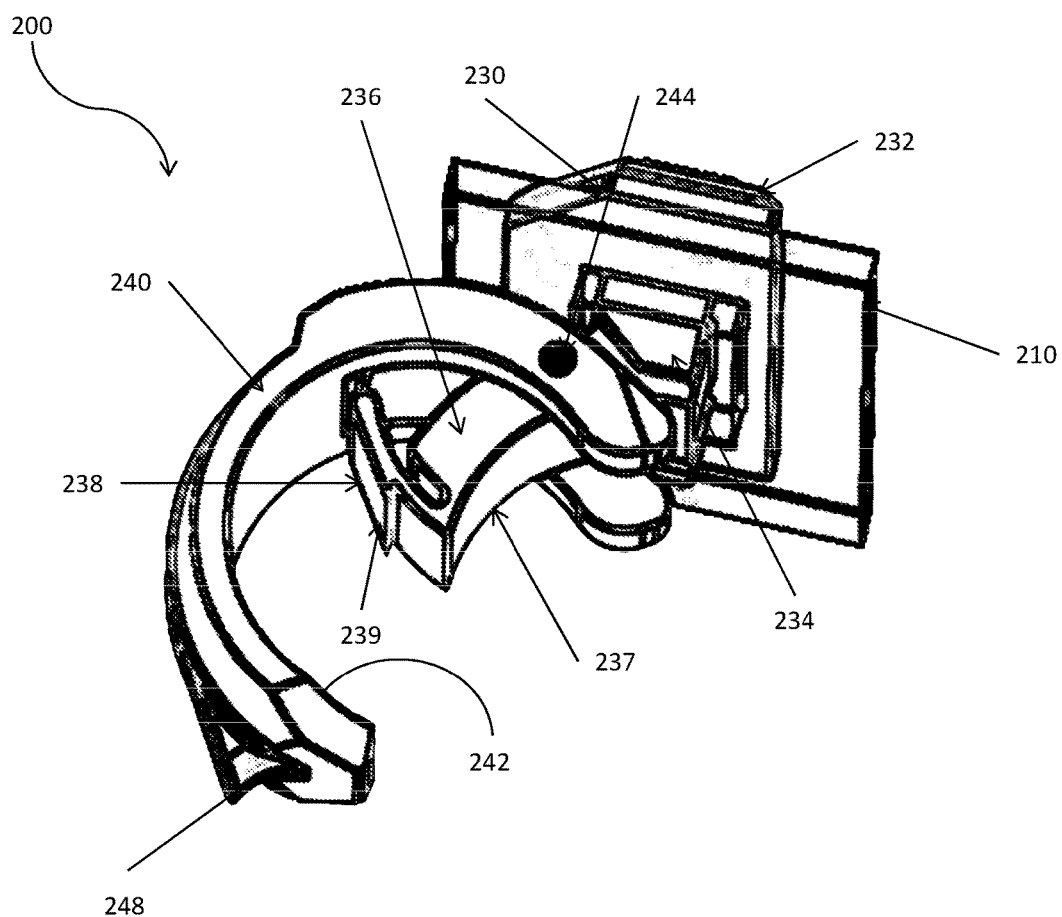
FIG. 4 is a perspective view of the clamp of FIG. 3.
Figure 5:
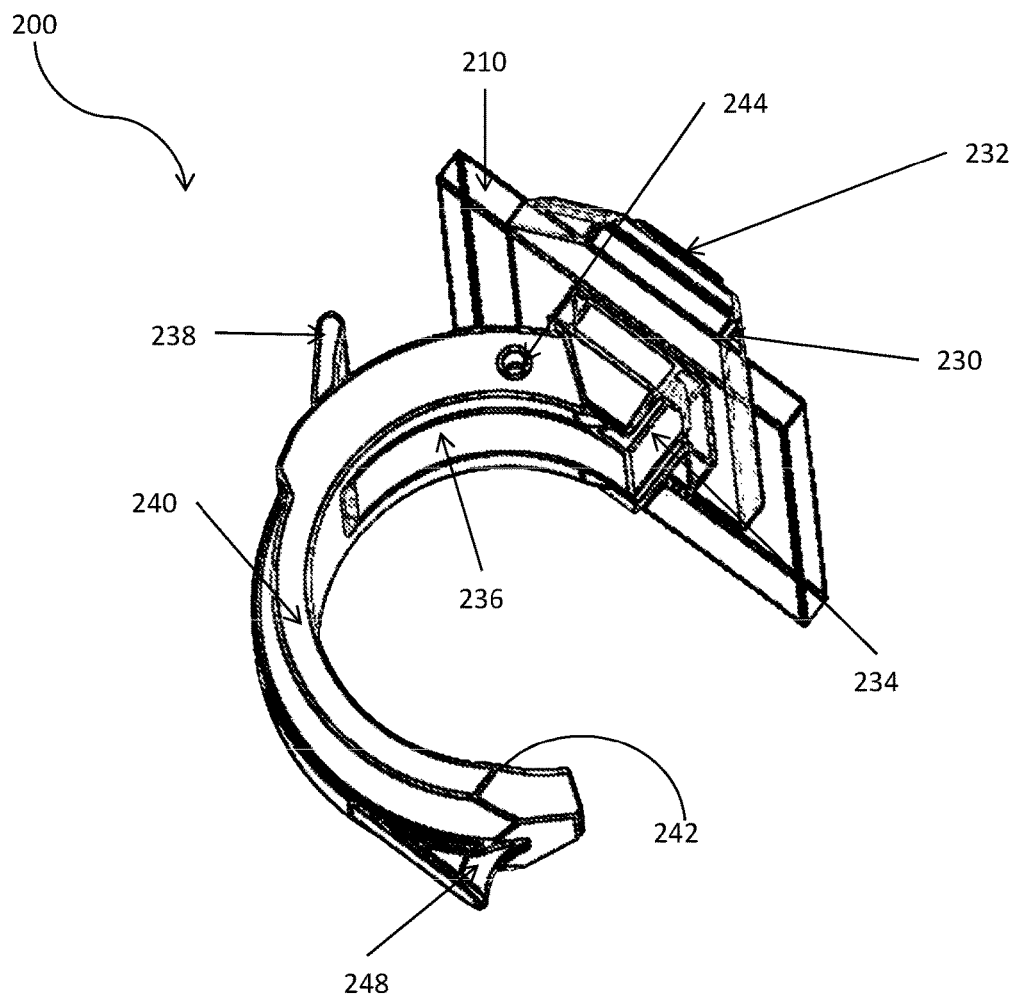
FIG. 5 is a perspective view of the clamp of FIG. 3 in a closed position.

FIGS. 3, 4, and 5 illustrate a non-limiting exemplary embodiment of a clamp 200. As shown, the clamp 200 may be configured to couple an element or accessory, such as a windshield 210, to a vehicle body. The clamp 200 may generally have a device portion 230 configured to interact with the windshield 210 or other element or accessory, and a vehicle portion 240 configured to interact with the vehicle.

In some embodiments, the device portion 230 of the clamp 200 may have an outer portion 232 and a pass through portion 234 in some embodiments. The outer portion 232 may be configured to be arranged on an outer surface of the windshield 210 or other element or accessory, so as to grip or hold the windshield or other element or accessory. Where the element is a windshield 210 as shown in FIGS. 3-5, the outer portion 232 may be arranged on or against an external surface of the windshield 210. In some embodiments, the outer portion 232 may have a padded or rubber surface to more easily or effectively grip the windshield 210 surface without damaging the windshield. The pass through portion 234 may be configured to pass through the windshield 210 or other element or accessory. As shown in FIGS. 3-5, the pass through portion 234 may pass from an outer surface of the windshield 210, where the pass through portion couples to the outer portion 232, through an opening in the windshield, to an inner surface of the windshield, where the pass through portion couples to the vehicle portion 240. In this way, the windshield 210 or other element or accessory may have an opening configured to receive the pass through portion 234. In some embodiments, the pass through portion 234 may be configured to float within the windshield 210 so as to accommodate tolerance variations on the vehicle and the windshield. In this way, the clamp 200 may be self-adjusting to accommodate tolerance variations. The pass through portion 234 may generally have a smaller width or diameter than the opening of the windshield 210 such that it may fit through the opening. The outer portion 232 may generally have a width or diameter larger than the opening of the windshield 210, such that it may grip or be arranged on a portion of the windshield surrounding the opening.

In some embodiments, the device portion 230 may have a lock 236, which may extend from the pass through portion 234. The lock 236 may be configured to be arranged within the vehicle portion 240. The lock 236 may generally have a lock member 237 and a release trigger 238. The lock member 237 may be configured to slide or fit within a portion of the vehicle portion 240, as will be further described below. The release trigger 238 may extend from the lock member 237 at an angle and may generally be configured to flex or bend with respect to the lock member. In some embodiments, the connection between the lock member 237 and the release trigger 238 may include relatively thin section of plastic, metal, or any other suitable material, and a gap between the lock member and release trigger, such that the release trigger may be flexed, bent, or pushed down toward the lock member. In some embodiments, the release trigger 238 may have a ridge 239. The ridge 239 may be configured to catch on a portion of the vehicle portion 240 so as to help hold the lock 236 in place within or with respect to the vehicle portion.

In some embodiments, the vehicle portion 240 of the clamp 200 may generally be configured to removably or fixedly couple to the device portion 230 so as to secure the windshield 210 or other element or accessory. In some embodiments, the vehicle portion 240 may be configured to couple to an element of the vehicle body, such as metal or plastic bar or other frame element. In some embodiments, the vehicle portion 240 may have an opening 242 configured to receive an element of the vehicle body or a portion thereof. The opening 242 may have any suitable size and shape configured to receive a suitable element of the vehicle body, such as metal or plastic bar or tube or a portion thereof. In some embodiments, the opening 242 may be sized and shaped to receive a rounded bar or tube. In some embodiments, the opening 242 may be sized and shaped to receive a different shaped bar or tube or a ROPS tube. In some embodiments, the opening 242 may generally have a semi-circular or semi-oval shape. In some embodiments, the opening 242 may have one or more ridges or straight edges to accommodate a bar, tube, or other vehicle element. The bar, tube, or other vehicle element may be removably or fixedly arranged within the opening 242. The vehicle portion 240 and opening 242 may be configured such that the bar, tube, or other vehicle element may be pressed, slid, or snapped into the opening. In some embodiments, the vehicle portion 240 may slightly flex so as to accommodate receiving the bar, tube, or other vehicle element. In some embodiments, the vehicle portion 240 may couple to the vehicle body 220 via other means.

In some embodiments, the vehicle portion 240 may have a slot 243 for receiving the lock 236. That is, the slot 243 may be configured to receive the lock 236 such that an inner surface of the lock substantially aligns with an inner surface of the vehicle portion 240, as shown in FIG. 5. When the lock 236 is arranged within the slot 243, the release trigger 238 may extend beyond the vehicle portion 240. In some embodiments, the vehicle portion 240 may include a ridge (not shown) configured to oppose ridge 239 on the release trigger 238 when the lock 236 is within the slot 243. The two ridges may operate to lock the lock 236 into place within the slot 243.

In some embodiments, the vehicle portion 240 may include a pin 244 for coupling the vehicle portion to the device portion 230. The pin 244 may be a metal pin, configured to pass through aligned holes on the vehicle portion 240 and the device portion 230. In some embodiments, the vehicle portion 240 may be configured to rotate about the pin 244 so as to move the vehicle portion with respect to the lock 236. In some embodiments, the vehicle portion 240 may have a first position, which may be an open position as shown in FIGS. 3 and 4, and a second position, which may be a closed position as shown in FIG. 5. The vehicle portion 240 may generally be configured to pivot between the open position and closed position. In the open position, the lock 236 may be outside of the slot 243, and in the closed position, the lock may be arranged within the slot and "locked" in place via the ridge on the vehicle portion 240 and the ridge 239 on the release trigger 238. In some embodiments, the vehicle portion 240 may have any suitable number of positions through which it may rotate or pivot. In the closed position, the vehicle portion 240, coupled to the vehicle, may operate to pull the device portion 230 against the windshield 210. In some embodiments, the vehicle portion 240 may have one or more cam portions configured to pinch the windshield 210 between the vehicle portion and the device portion 230.

In some embodiments, the vehicle portion 240 may have a release handle 248. The release handle 248 may be configured to allow a user or operator to pry or pull the vehicle portion 240 off of a bar, tube, or other frame or vehicle element, so as to remove the windshield 210 from the vehicle. The release handle 248 may be of any suitable size and shape. In some embodiments, the release handle 248 may be sized and shaped such that a user or operator may push the release handle with a thumb or finger.

In use, the clamp 200 may generally operate to removably or fixedly couple the windshield 210, or other element or accessory, to the vehicle body. In some embodiments, the vehicle portion 240 may be coupled to a bar, tube, or other frame or vehicle element. As described above, the device portion 230 may be arranged on or in communication with the windshield 210 or other element or accessory. In some embodiments, the pass through portion 234 may be positioned through an opening in the windshield 210 configured to receive the pass through portion, such that the outer portion 232 is arranged adjacent to or against an outer surface of the windshield and the pass through portion extends beyond an inner surface of the windshield. The device portion 230 and vehicle portion 240 may be coupled together in order to secure the windshield 210 between the two components. In some embodiments, the device portion 230 and vehicle portion 240 may couple together by the metal or other material pin 244 configured to pass through aligned holes in each of the vehicle portion 240 and device portion 230. In some embodiments, the vehicle portion 240 may be configured to couple to a bar, post, or other element by snapping or pushing the bar or tube of the vehicle frame into the opening 242 of the vehicle portion and pivoting the vehicle portion to the closed position. In this way, the windshield 210 may be removably or fixedly coupled to the vehicle. One or more clamps 200 may be used to securely hold the windshield 210 on the vehicle during operation of the vehicle, so as to protect the operator from wind and/or debris. In some embodiments, two or four clamps 200 may be used to hold a windshield 210 onto a vehicle. In other embodiments, any suitable number of clamps 200 may be used.

In some embodiments, a user or operator may use the release handle 248 to pull or pry the vehicle portion 240 away from the bar, tube, or other vehicle element, so as to remove the windshield 210 from the vehicle. In some embodiments, the user or operator may use the release trigger 238 to disengage the lock 236 and allow the vehicle portion 240 to pivot to the open position. In this way, the windshield 210 may be removed for repair or replacement.

It will be appreciated that non-limiting exemplary embodiments of the clamps may be used to couple a different device to a motorized or non-motorized vehicle. In some embodiments, the clamps may be used for attaching a windshield or other accessory or element to a vehicle. Some embodiments of the clamp may operably be used to couple a roof, panel, or other vehicle component or accessory to a vehicle. In some embodiments, clamps may be generally operational from within the vehicle, such that the windshield or other accessory or element may not be removed without access to the interior of the vehicle. In some embodiments, the clamps may be operated without the use of tools. In some embodiments, the clamps may be configured to be quick-release clamps. Some embodiments of the clamps may generally have a low profile and may be operated without interrupting a gasket or other weather sealing surface. In some embodiments, the clamps may be constructed by injection molding. In some embodiments, any other suitable manufacturing process or processes may be used.

In view thereof, modified and/or alternate configurations of the embodiments described herein may become apparent or obvious to one of ordinary skill. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A clamp configured for removably coupling a windshield to a vehicle, the clamp comprising:
    a device portion configured to interact with the windshield, the device portion comprising:
        an outer portion comprising a surface configured for abutment with at least a portion of an outer surface of the windshield; and
        a pass through portion extending away from the surface of the outer portion and configured to extend through an opening in the windshield; and
    a vehicle portion operatively coupled to an end of the pass through portion, the vehicle portion comprising an opening configured for receiving at least a portion of an element of the vehicle, wherein the opening is at least partially flexible.

2. The clamp of claim 1, wherein the device portion and vehicle portion are coupled together by one or more pins, and wherein the vehicle portion is pivotable about the one or more pins.

3. The clamp of claim 1, wherein the vehicle portion is configured to be coupled to and removed from the element of the vehicle without using tools.

4. The clamp of claim 1, wherein the vehicle portion comprises one or more cams configured to engage an internal surface of the windshield.

5. The clamp of claim 4, wherein at least one of the one or more cams is configured for securing the windshield between the outer portion of the device portion and the vehicle portion.

6. The clamp of claim 1, wherein the element of the vehicle is one of a frame, a bar, a tube, and a roll over protection structure.

7. The clamp of claim 1, wherein the surface of the outer portion of the device portion is configured for gripping the outer surface of the windshield.

8. The clamp of claim 1, wherein the vehicle portion is rotatable relative to the device portion.

9. The clamp of claim 1, wherein the vehicle portion comprises a release handle configured to enable an operator to disengage the vehicle portion from the element of the vehicle.

10. The clamp of claim 1, configured to secure the windshield between the outer portion of the device portion and the vehicle portion.

11. The clamp of claim 1, wherein the opening of the vehicle portion has a semi-circular or a semi-oval shape.

12. The clamp of claim 1, wherein the opening of the vehicle portion comprises one or more ridges or straight edges.

13. The clamp of claim 1, wherein the vehicle portion is pivotally coupled to the device portion.

14. The clamp of claim 13,
    wherein the device portion comprises one or more grooves;
    wherein the vehicle portion comprises one or more pins; and
    wherein each of the one or more grooves is configured for receiving at least one of the one or more pins.

* * * * *